F. G. JANNEY.
ORE CLASSIFIER.
APPLICATION FILED SEPT. 28, 1910.
984,222.
Patented Feb. 14, 1911.
4 SHEETS—SHEET 1.
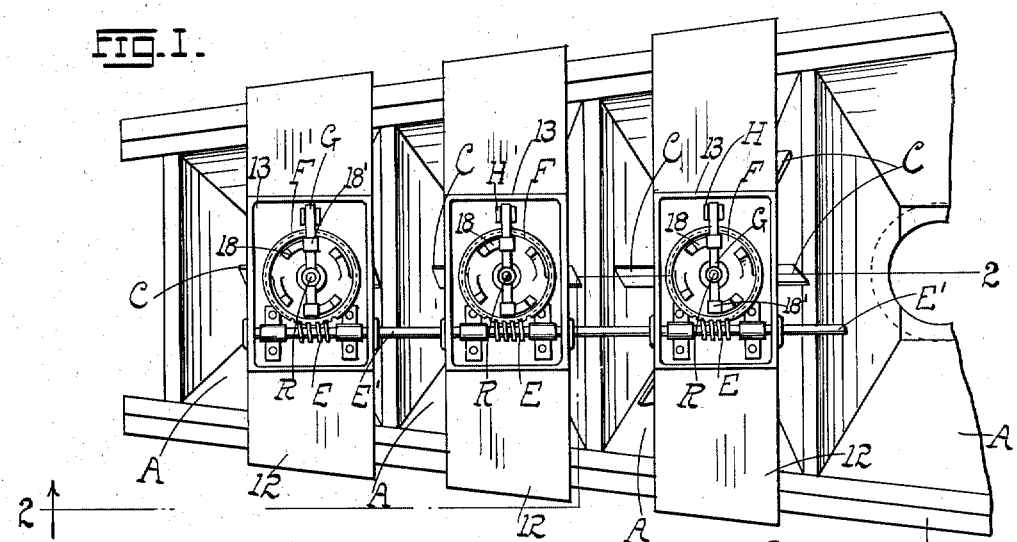
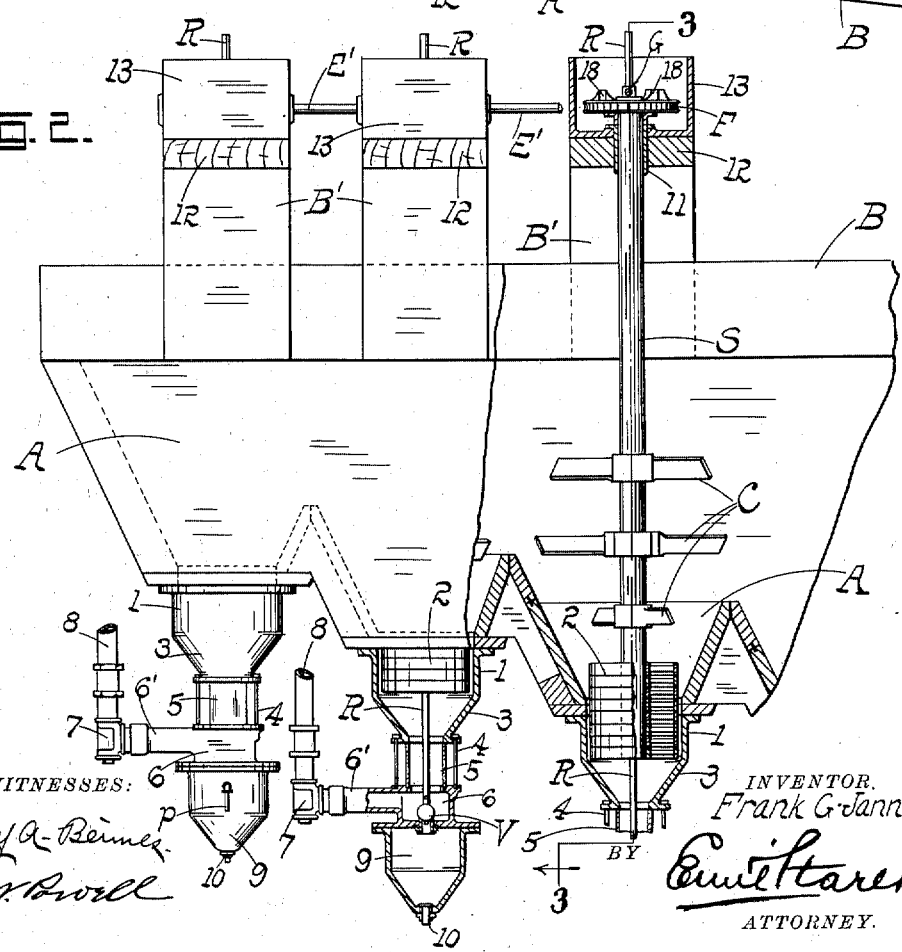
WITNESSES:
Harry A. Berner
A. W. Buell
INVENTOR.
Frank G. Janney.
BY Emil Stark
ATTORNEY.

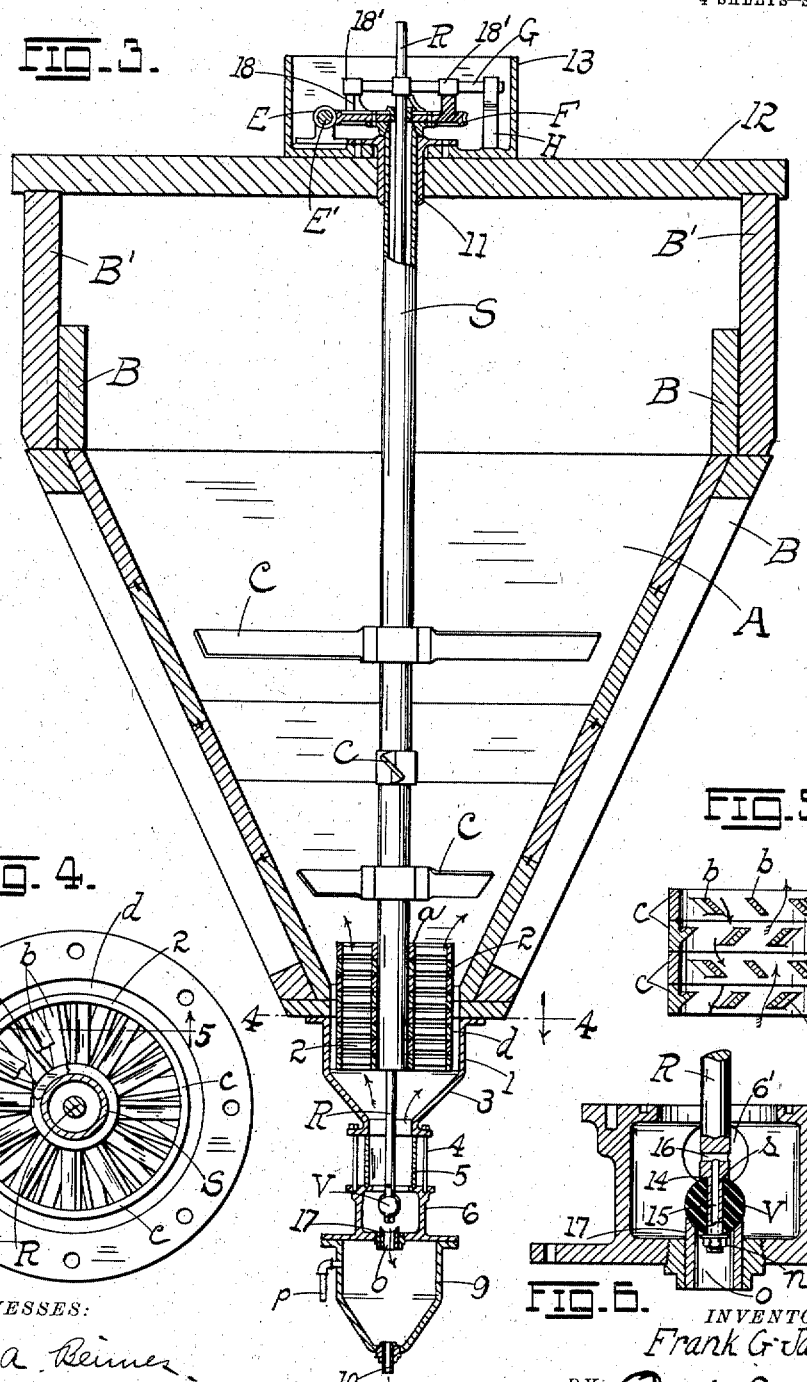

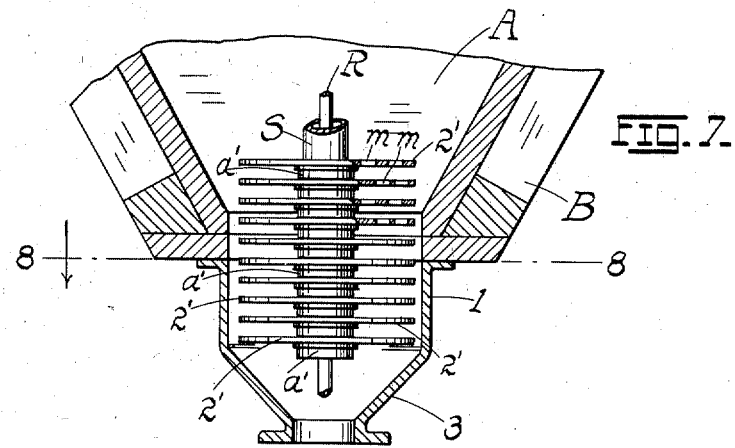
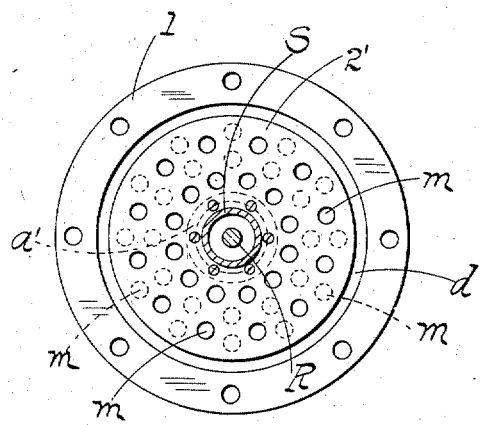
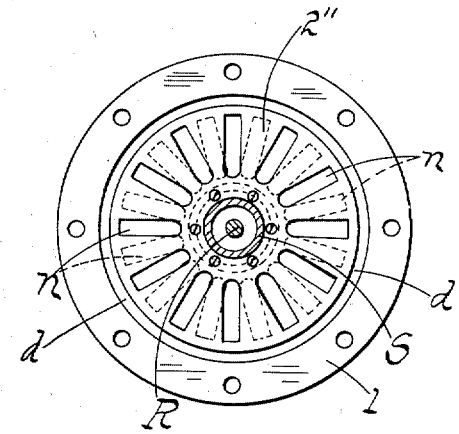

F. G. JANNEY.
ORE CLASSIFIER.
APPLICATION FILED SEPT. 28, 1910.
984,222.
Patented Feb. 14, 1911.
4 SHEETS—SHEET 4.
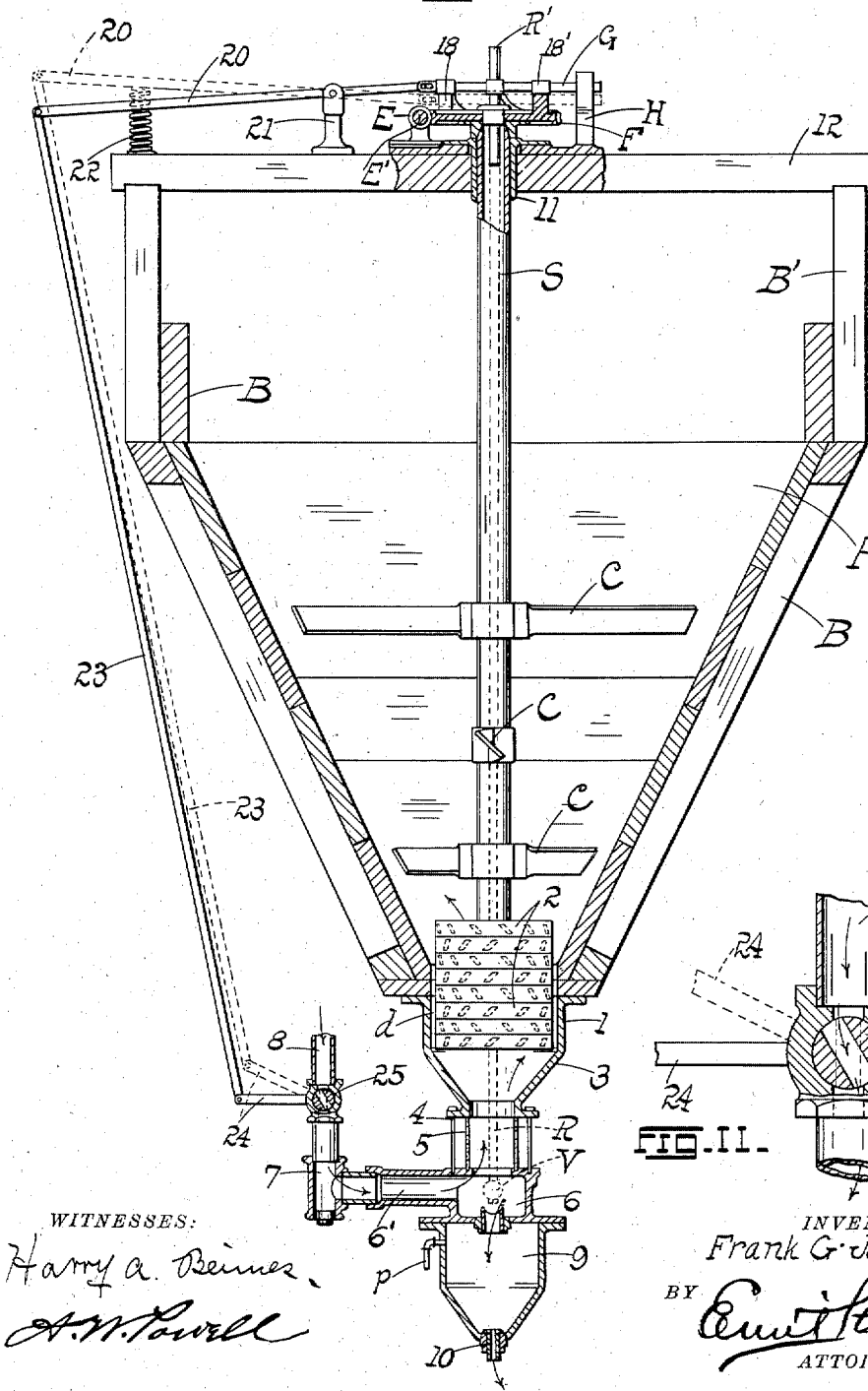
WITNESSES:
Harry A. Beines
A. W. Powell
INVENTOR.
Frank G. Janney.
BY Ernst Stover
ATTORNEY.

UNITED STATES PATENT OFFICE.

FRANK G. JANNEY, OF SALT LAKE CITY, UTAH.

ORE-CLASSIFIER.

984,222.

Specification of Letters Patent. Patented Feb. 14, 1911.

Application filed September 28, 1910. Serial No. 584,313.

*To all whom it may concern:*

Be it known that I, FRANK G. JANNEY, a citizen of the United States, residing at Salt Lake City, in the county of Salt Lake and State of Utah, have invented certain new and useful Improvements in Ore-Classifiers, of which the following is a full, clear, and exact description, reference being had to the accompanying drawings, forming a part hereof.

My invention has relation to improvements in ore-classifiers; and it consists in the novel construction and arrangement of parts more fully set forth in the specification and pointed out in the claims.

In the drawings, Figure 1 is a top plan of a series of ore-classifiers showing my invention applied thereto; Fig. 2 is a combined vertical longitudinal elevation, and section on the line 2—2 of Fig. 1; Fig. 3 is an enlarged vertical cross-section on the line 3—3 of Fig. 2, taken through one of the series of classifiers; Fig. 4 is an enlarged horizontal section on the line 4—4 of Fig. 3 taken on the plane of the outer flange of the sorting chamber and between two juxtaposed spiders secured to the stirrer shaft; Fig. 5 is a vertical sectional detail on the line 5—5 of Fig. 4 through the spokes of four successive spiders showing the staggered arrangement of the spokes and of the passages between them; Fig. 6 is an enlarged vertical middle sectional detail of the combined continuous and intermittent discharge valve; Fig. 7 is an elevational detail (with pulp hopper and sorting chamber in section) showing a modification of the spiders illustrated in previous views; Fig. 8 is a horizontal section on the line 8—8 of Fig. 7 similar to Fig. 4; Fig. 9 is a similar section of a still further modification of the spider; Fig. 10 is a section on the order of Fig. 3 showing however, a pulsating hydraulic feed in lieu of the uniform feed of the latter figure; and Fig. 11 is an enlarged sectional detail of the feed rockvalve.

The present invention is an improvement on the ore-classifier covered by my U. S. Patent numbered 928,455, dated July 20, 1909; and while contemplating the several objects, and possessing the various advantages of the patented construction, it possesses the additional advantages (1) of breaking up all currents which destroy the desired effect of a uniform and homogeneous rising column, (2) of keeping the particles of ore separate and according each particle the individual benefit of such rising column, and (3) of enabling the rising column to effectively carry off the lighter particles from one hopper to the next hopper of the series.

For proper classification one of the objects sought is to secure an equal upward velocity for each rising molecule of water throughout the entire cross-section of such column so that the necessity of breaking up disturbing currents which destroy this molecular equality of flow becomes imperative. This has heretofore been accomplished by subjecting the rising column entering the "spitzkasten" to a spiral or whirling motion brought about either by a tangential projection of the hydraulic current into a well beneath the spitzkasten, or by means of a screw conveyer operating in a final sorting chamber interposed between the hopper or "spitzkasten" and a bottom retarding chamber such as shown in my U. S. Patent numbered 964,261, dated July 12, 1910. In the present improvement this is accomplished by subjecting the rising column in such sorting chamber and in the bottom of the hopper, and below the stirrer arms in said hopper, to the action of suitable mechanical agitators which offer a series of preferably staggered or zig-zag passageways to the rising molecules, the breaking up of disturbing currents being most effective, and the individual particles of ore being kept separated from one another. The present improvement contemplates in addition, the introduction of a combined continuous and intermittent discharge valve for the concentrates, which thereby reduces the time during which the valve need remain unseated. It contemplates further the introduction (if desirable) of a pulsating hydraulic feed and other details the advantages of which will be fully apparent from a detailed description of the invention, which is as follows:—

Referring to the drawings, (and for the present to Figs. 1 to 6 inclusive) in which Figs. 1 and 2 show a conventional series of ore-classifier hoppers or "spitzkasten" well known in the art, the classifier consists of a long tapering box or trough B, which is divided into a series of successive compartments, hoppers or pulp containers A progressively increasing in depth and capacity toward the wide end of the box or that end at which the slime-water is discharged and toward which the pulp is directed by the general flow of the water from one compartment to the next compartment of the series. Of course, any one compartment constitutes a classifier in itself, so that a detailed description of one will answer for all.

Mounted centrally within the compartment, hopper or container A is a hollow rotatable shaft S to which are affixed a series of paddles or stirrer arms C progressively increasing in length with the inclination of the walls of the compartment. The shaft extends downward into and through a bottom cylindrical, final sizing or sorting chamber 1 virtually forming an extension of the hopper, wherein the shaft is provided with a cluster of juxtaposed spiders 2 which extend a suitable distance into the hopper proper. These spiders, as fully shown in the drawings (Figs. 3, 4, 5) comprise a central hub $a$ (keyed or otherwise secured to the shaft S), a series of spokes $b$ (having flat deflecting faces) and an outer rim $c$, the spiders being so set that the spokes of any one member come vertically opposite the space between the spokes of the spiders on either side thereof, thus bringing about a staggered relation between the spokes of successive spiders (Figs. 4, 5). In this way the rising column of water as well as the descending concentrates must traverse a zigzag or staggered series of passage-ways (see arrows in sectional view Fig. 5). The spokes which are oblong in cross-section are set at opposite inclinations in the successive spiders so as to better deflect the currents impinging against them and cause them to traverse the staggered path determined for them. The chamber 1 is preferably provided with a bottom conical discharge mouth 3, the shaft S terminating however, in the horizontal plane of the lower end of the cylindrical portion or sorting chamber proper, the same as in my Patent 964,261 referred to. Secured to the lower flanged end of the mouth 3 by means of tie-rods 4 is a glass observation cylinder 5 the bottom of which couples up to a union 6 provided with a leg 6′ which in turn terminates in a tee 7 to which is coupled the discharge end of the line-pipe 8 leading to any suitable source of hydraulic water-supply (not shown). To the union 6 is coupled the bottom retarding chamber 9 which is provided with a bottom discharge nozzle or bushing 10 having a more or less constricted passage-way. The purpose of the retarding chamber, as set forth in my prior patents, is to maintain a slight upward current for holding fine particles of slime in suspension during the discharge of the classified material.

The shaft S is propelled by a worm-pinion E (on the drive-shaft E′) engaging the worm-gear F secured to the upper end of the shaft, and may be rotated from any source of power (not shown) at any desired speed. The upper end of the shaft S is supported in a bearing 11 on a plank or plate 12 mounted across the top of the container and supported on the brackets or extensions B′ of the box B, the gearing being protected by boxes or housings 13 through the vertical walls of which the shaft E′ freely passes, and by which it is in a measure supported. Of course, any available mechanical manner of supporting the shafts S and E′ may be resorted to.

Loosely operating in the hollow stirrer-shaft S is a rod R, the lower end of which is provided with a valve V, preferably a rubber ball passed over the terminal stem $s$ of the rod, and bearing against the annular shoulder 14 at the top of the stem, a nut $n$ passed over the terminal screw-threaded end of the stem driving the ball well against the shoulder aforesaid. The stem $s$ is tubular being provided with a passage-way 15, the upper end of which is intersected by a cross-passage-way 16 formed in the rod R a short distance above the shoulder 14. The arrangement thus results in a combined continuous and intermittent discharge-valve as presently will more fully appear. The valve V controls the discharge port $o$ formed in the valve-seat 17 at the bottom of the union 6, the passage 15 being in permanent communication with said port, be the valve V seated or unseated. To the upper projecting end of the rod or valve-stem R is secured a cross-arm or bar G one end of which projects beyond the periphery of the worm-gear F and is guided between the fork members or bracket-arms H (in the housing 13) which are of sufficient height to allow the arm G the necessary vertical movement in the reciprocations to which it is subjected in operating the valve V.

Disposed on the top face of the worm-gear F are a series of cams or tappets 18 which in the rotation of the worm-gear impinge in pairs against the arm G (striking the rings 18′ with which it is preferably provided) and thereby lift the stem R and its valve V. After the cams have passed off the arm G, the rod R with its valve V drops by gravity to its lowest position bringing the valve against its seat 17 and preventing the discharge of all material which accumulates around the stem R below the cross-passage 16. Of course, the upper strata of classified material or those above the passage 16 will discharge continuously through the passages 15, 16, $o$ into the retarding chamber 9 whence all concentrates are discharged through the bushing 10. The continuous discharge of a portion of the concentrates as just described permits the raising of the valve V for comparatively short periods, the lifting projections of the cams 18 being thus reduced in area to a minimum so as to engage the arm G for short periods only, or only for sufficient periods to effect the necessary discharge of the material accumulating below the plane of disposition of the cross-passage 16. Of course, the shorter the periods of unseating of the valve V, the more effective will be the classifying action of the rising hydraulic current. The present arrangement thus constitutes a happy medium between a system of continuous, and an intermittent discharge of concentrates, being a combination of continuous and intermittent discharges.

In general, the present classifier corresponds to that described in my prior patents aforesaid, the improvements herein being directed to the discharging means, and to the means for breaking up all disturbing currents in the classifying water-column, one example of such means being shown in the cluster of spiders with their staggered passage-ways as previously described. Features shown but not alluded to are old in the art, and hence need not be described herein.

The operation, which may be conveniently described at this point is substantially as follows:—As the pulp flows from the narrow to the wide end of the classifier box from one container A to the next container of the series, the contents of each container are stirred by the stirrer arms C, the classified material being in part (the upper and comparatively lighter concentrates) continuously discharged through the passages 16, 15, port $o$ into the retarding chamber 9 and out through the nozzle 10 thereof, and in part (the heaviest particles) intermittently discharged by the raising of the valve V. Of course, the classification is accomplished by the rising column of water directed from the hydraulic line or pipe 8 into the container through the sizing or sorting chamber 1 into and through which the heavier ore particles are constantly falling against the rising current, the lighter particles being carried over into the next succeeding container. The rising column in the sorting chamber 1 is subjected by the nest of spiders 2 to a species of agitation which breaks up all such currents as tend to destroy the desired effect of a uniform and homogeneous rising column, the members 2 in their rotation (which is at the same angular velocity as the shaft S and its arms C) keeping apart the individual particles of ore so as to accord to each particle the benefit of the rising column, the latter in its sinuous passage through the staggered openings of the spiders allowing the finer particles (intended for the next succeeding container) to work their way up through the coarser ones that are descending. As the classified material falls through the sizing chamber it is directed by the conical mouth 3 into the observation cylinder 5 whence it precipitates into the union 6. From this it is discharged continuously and intermittently in the manner previously described into the bottom retarding chamber 9 whence the concentrates flow through the nozzle 10. The same action takes place in each container of the series, each succeeding container treating the overflow from the one preceding it, until the last hopper is reached whence the slimes pass off to the proper concentrating apparatus. If desired, the passage-ways 16, 15, may be closed or dispensed with so that the classifier may be made exclusively intermittent from the standpoint of discharge, such a change in no wise affecting the action of the spider agitators.

The form of agitator 2 which has been described may have substituted therefor other patterns which will operate in substantially the same way, and are contemplated within the scope of the present invention. For example in Figs. 7 and 8 I show a nest of circular plates or disks 2' carrying spacing hubs $a'$, and provided with circular openings $m$, the openings of one disk being out of alinement with those of adjacent disks; and in Fig. 9 I show disks 2'' with radially disposed slots $n$, likewise in staggered relation, which the currents must traverse, the classifying water column with its suspended particles passing upward, and the concentrates working their way downward as already explained. In their assembled position, the spiders 2 (or either of their equivalents 2', 2'', and others which the skilled mechanic may devise) may be collectively considered as an agitator which is provided with series of tortuous or zigzag passage-ways which the classifying column must traverse for the purpose of breaking up and destroying any and all currents which interfere with the uniform classifying action desired for the entire cross-section of such column. In the examples here illustrated such zig-zag passage-ways are formed by the inter-communicating series of staggered openings of the assembled component members or sections of such agitator. In the first form described, the spokes $b$ need not necessarily be flat as shown, nor is the outer rim $c$ absolutely indispensable.

The hydraulic feed thus far has been assumed to be and is shown as uniform and constant; but I may substitute in lieu thereof any convenient form of intermittent or pulsating feed, the one preferred being actuated from the tappets 18. Where the pulsating feed is employed it may be used in connection with a constant discharge in which event the rod R may be reduced to a short stem R' (Fig. 10) to which the cross-arm G is secured. To one end of the arm G is pivotally and loosely coupled the end of the short arm of a tripping lever 20 fulcrumed to a bracket 21 over the hopper A, the long arm bearing against an expanding spring 22 positioned at one edge of the hopper, the free end of the long arm being coupled to the upper end of a link 23 whose opposite end is pivotally secured to the crank arm 24 leading from one end of a rock-valve 25 mounted at the base of the line-pipe 8. As the tappets 18 raise the bar G, the lever 20 will be tripped so as to depress the outer end, this in turn oscillating the arm 24 in proper direction to rock the valve to a partially closed position; when the tappets have passed off the bar G, the spring 22 (which was compressed by the downward movement of the long arm of the lever) will force the lever in the opposite direction and rock the valve 25 to full open position. In this way the flow of the water will be partially interrupted at regular intervals, thus feeding by a series of pulsations. During the periods of partial interruption the material in the sorting chamber is allowed to discharge, the pressure in the rising column at such periods being considerably reduced.

The pulsating feed might be used in connection with an intermittent discharge such as shown in my prior patents. The stem R' might be extended to its original full length (stem R) and each time the valve V would unseat the rock-valve 25 would partially close, in which interval the material would discharge past such unseated valve V; as the latter seated itself upon the freeing of the bar G from the tappets 18, the spring 22 would rock the feed-valve 25 to full open position allowing the classifying action of the water full play, the material again discharging when the valve V was next unseated and the valve 25 partially (or even wholly if desired) closed. Of course, the use of a pulsating feed in connection with a constant discharge requires more hydraulic water as compared with a constant feed and an intermittent discharge. The use of one as against the other will depend on local conditions.

In practice an annular clearance $d$ should be left between the inner wall of the sorting chamber 1 and the agitator member composed of the nest of spiders 2 or their equivalents.

Obviously the classifier need not be confined to the treatment of ores, but may be used for classification generally.

The retarding chamber 9 is provided with vent-tubes $p$ to allow the air to escape when the valve V opens to discharge the contents of the classifier into the chamber. Otherwise the retarding chamber would air-trap.

Having described my invention, what I claim is:—

1. An ore-classifier comprising a suitable container for the pulp, means for directing thereinto a rising column of water, means rotating about a fixed axis in and confined to the container for rotatively stirring the contents thereof, and a series of juxtaposed agitators coupled to and located below the stirring means and rotating about the same axis, and interposed in the path of the rising column, said agitators being provided with openings, those of one member being relatively staggered with those of an adjacent member, whereby zig-zag passage-ways are formed for the traverse of the rising column.

2. An ore-classifier comprising a suitable container, a bottom sorting chamber opening into the container, means for directing into the container through the sorting chamber a rising column of water, there being a discharge port for the sorting chamber, a rotatable mechanical agitator comprising a shaft and stirrer arms located in the container, the shaft extending into the sorting chamber, a series of spiders placed in contiguous relation to one another and secured to the shaft within the sorting chamber and at the base of the container, said spiders being provided with openings, those of one spider being out of alinement with the openings of adjacent spiders, whereby zig-zag passage-ways are formed for the traverse of the rising water column.

3. An ore-classifier comprising a suitable container, a bottom sorting chamber opening at the top into the container and provided with a bottom discharge port, means for directing a rising column of water into the container through the sorting chamber, a rotatable mechanical agitator comprising a shaft and stirrer arms located in the container, the shaft extending into the sorting chamber, a series of juxtaposed members secured to the shaft within the sorting chamber and extending into the bottom of the container below the stirrer arms, a series of staggered passage-ways being formed in the assembled series of members aforesaid for the traverse of the rising water-column.

4. A classifier comprising a pulp-container provided with stirring means, a sorting chamber communicating with the container through the bottom thereof, means for directing through the sorting chamber and into the container a rising column of water, an agitator rotating in the sizing chamber and extending into the bottom of the container for subjecting the rising water column to the traverse through series of zig-zag passage-ways, and a retarding chamber below the sorting chamber for discharging the classified material.

5. In an ore-classifier, a suitable container, a hydraulic line-pipe for delivering water under pressure into the container, a rotatable disk mounted over the container and provided with tappets, a vertically reciprocating stem operating loosely through the center of the disk, a cross-arm on the stem periodically engaged by the tappets, a spring-controlled lever fulcrumed above the container and having one arm pivotally coupled to one end of the cross-arm, a rock-valve mounted in the line-pipe, a crank-arm carried by the valve, a link connecting the crank-arm to the opposite arm of the lever, whereby the valve is rocked in one direction under the impact of the tappets with the cross-arm, and in the opposite direction by the spring controlling the lever, and a pulsating feed is effected thereby.

In testimony whereof I affix my signature, in presence of two witnesses.

FRANK G. JANNEY.

Witnesses:
THOMAS A. JANNEY,
ELBERT R. WILLIAMS.